July 1, 1952        G. H. TREDE        2,601,731
FLUID TIGHT VERTICAL BEARING
Filed Nov. 29, 1946
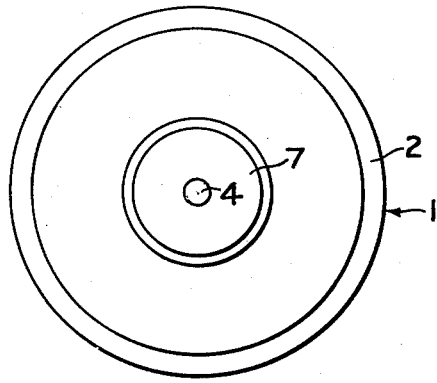
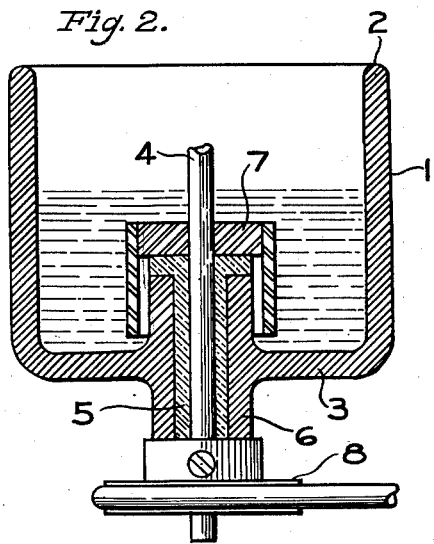
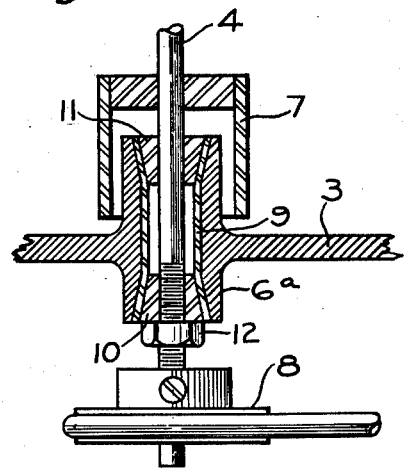
INVENTOR.
Geo. H. Trede
BY
Merrill M. Blackburn Patented July 1, 1952

2,601,731

UNITED STATES PATENT OFFICE 2,601,731

FLUIDTIGHT VERTICAL BEARING

George H. Trede, Durant, Iowa

Application November 29, 1946, Serial No. 713,027

4 Claims. (Cl. 308—36.3)

My present invention relates to bearings and more particularly shaft bearings of shafts that are to be partly immersed in fluid, such as the shafts of washing machine dollies, lens edgers, and the like. The objects of this invention are to provide a bearing for a rotary shaft which is so constructed and arranged that a fluid in which the shaft is partly submerged will not be able to escape through the bearing; the provision of an improved bearing for the purpose stated; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof:

Fig. 1 is a plan view of a structure embodying my present invention;

Fig. 2 represents a central vertical section of the structure shown in Fig. 1; and Fig. 3 shows a fragmentary vertical section, comparable to Fig. 2, of a modified form of that structure.

Reference will now be made in greater detail to the annexed drawings for a more complete description of this invention. A fluid container is represented at 1, whether this be a washing machine tub or the cooling fluid container of a lens edger, or other structure having a similar use. This container has an upstanding wall 2 and a bottom 3, provided in its central portion with an opening for the reception of a shaft 4.

In the structure shown in Fig. 2, the shaft 4 rotates in a bearing element, or such element may be non-rotatably secured to the shaft 4 and rotate within the sleeve 6 extending upwardly and downwardly from the bottom 3. An inverted cup 7 is centrally apertured for the reception of the shaft 4 which fits the opening in the cup in fluid-tight relation. If the shaft rotates in the bearing members 5, the cup will turn on the upper end thereof and will keep the shaft from slipping downwardly. In the two forms shown in Figs. 2 and 3, a pulley 8 is secured to the shaft 4 outside of the container 1 and serves to rotate the shaft.

In the structure of Fig. 3, the flange 6a is inwardly beveled or reamed at its ends and has a bearing sleeve 9 fitting tightly therein. Fitting in the two ends of this sleeve are frustoconical plugs 10 and 11 which fit the shaft 4 tightly and rotate within the bearing sleeve. The plug 10 may be screwed on the shaft 4 and locked in adjusted position by the nut 12. In both structures, the cup 7, depending below the top of the sleeve 3 forms an air pocket which keeps the fluid from reaching and escaping through the bearing. This cup may be made of two tightly connected parts, as shown, or may be made as an integral structure but, in either event, it must fit the shaft 4 tightly.

It is of course understood that the specific description of structure set forth above may be departed from without departing from the spirit of this invention as disclosed in this specification and as defined in the appended claims.

Having now described my invention, I claim:

1. A fluid-tight vertical bearing for submerged operation in a fluid container, comprising a sleeve extending upwardly from the bottom of the container, a bearing sleeve fitting therein and having at its upper end an extended flange section overlying the upper end of said sleeve, a shaft extending through said bearing sleeve and rotatable therein, and an inverted cup-shaped member rotating with said shaft and embracing the upper end of said bearing and container sleeves, said cup-shaped member comprising a part apertured centrally and affixed to said shaft, said part bearing against the upper face of said bearing sleeve flange and serving to transmit end thrust from the shaft to said bearing sleeve flange, and a skirt part affixed at its upper end in leak-tight relation to the outer edges of said part and depending therefrom and surrounding the upper portions of said container sleeve so as to trap air thereabout, the pressure of said end thrust serving to prevent loss of air between said upper cup part and said bearing sleeve flange.

2. A fluid-tight vertical bearing for submerged operation in a liquid container comprising a sleeve extending upwardly from the bottom of the container, a bearing sleeve fitting therein and having at its upper end an upwardly divergingly tapered portion, a shaft extending through said bearing sleeve and rotatable therein, said shaft carrying a tapered plug affixed thereto and shaped to fit in fluid-tight relation within the upwardly tapered portion of said bearing sleeve and to transmit end thrust from the shaft to said bearing sleeve, and an inverted cup-shaped member rotating with said shaft and having a depending cylindrical portion surrounding the upper portion of said container sleeve so as to entrap air thereabout, the pressure of said end thrust serving to tightly engage said tapered plug with said tapered portion of the bearing sleeve and thus prevent loss of air between the upper interior of said cup-shaped member and the upper end of said bearing sleeve.

3. A fluid-tight vertical bearing as defined by claim 2 in which the lower end of said bearing sleeve and said container sleeve are downwardly and outwardly tapered, and a lower tapered plug adjustably affixed to the lower end of said shaft and having bearing connection with the lower tapered portion of said bearing sleeve.

4. A fluid-tight vertical bearing for submerged operation in the lower part of a liquid container having a sleeve extending approximately vertically upwardly from the bottom of the container, said bearing comprising a sleeve fitting in said container sleeve and having a radially larger portion at its upper end bearing axially against the upper portion of said container sleeve, a shaft extending through said bearing sleeve and rotatable therein, means fixed to said shaft at the upper end of said container sleeve and having bearing engagement with the radially larger portion at the upper end of said bearing sleeve, said means serving to transmit end-thrust from said shaft to said bearing sleeve, and means forming an inverted cup-shaped member fixed at its upper end to said shaft and including a depending cylindrical portion surrounding the upper end of said container sleeve and serving to entrap air about the upper end of said sleeve, the pressure of said end-thrust from said shaft against the upper portion of said bearing sleeve serving to prevent loss of air from the interior of said cup-shaped member.

GEO. H. TREDE.

REFERENCES CITED

The following references are of record in the file of this patent:

UNITED STATES PATENTS

| Number | Name | Date |
|---|---|---|
| 714,007 | Mittag | Nov. 18, 1902 |
| 1,943,227 | Parker | Jan. 9, 1934 |
| 2,143,373 | Gaertner | Jan. 10, 1939 |